United States Patent
Bettermann

(10) Patent No.: US 9,062,658 B2
(45) Date of Patent: Jun. 23, 2015

(54) ROTOR BLADE FOR A WIND TURBINE, AND A COMBINATION OF A RADAR STATION AND A WIND TURBINE

(75) Inventor: Joachim Bettermann, Delmenhorst (DE)

(73) Assignee: EADS Deutschland GmbH, Ottobrunn (DE)

( * ) Notice: Subject to any disclaimer, the term of this patent is extended or adjusted under 35 U.S.C. 154(b) by 650 days.

(21) Appl. No.: 13/310,086

(22) Filed: Dec. 2, 2011

(65) Prior Publication Data
US 2012/0141285 A1 Jun. 7, 2012

(30) Foreign Application Priority Data

Dec. 3, 2010 (DE) .......... 10 2010 053 369

(51) Int. Cl.
| | |
|---|---|
| *F03D 1/06* | (2006.01) |
| *F03D 11/00* | (2006.01) |
| *G01S 13/52* | (2006.01) |
| *H01Q 15/16* | (2006.01) |

(52) U.S. Cl.
CPC .......... *F03D 1/0675* (2013.01); *F03D 11/0041* (2013.01); *F05B 2260/99* (2013.01); *F05B 2280/6003* (2013.01); *G01S 13/52* (2013.01); *H01Q 15/16* (2013.01); *Y02E 10/721* (2013.01)

(58) Field of Classification Search
CPC .. F05B 2240/30; F05B 2260/99; F03D 1/065; F03D 1/0675; F03D 11/00; F03D 11/0041
USPC ........ 416/229 R, 230, 241 R, 241 A; 342/1–4
See application file for complete search history.

(56) References Cited

U.S. PATENT DOCUMENTS

| | | | |
|---|---|---|---|
| 2,923,934 A * | 2/1960 | Otto ................. | 342/1 |
| 5,474,837 A | 12/1995 | Duke, Jr. et al. | |
| 2011/0129352 A1 | 6/2011 | Bettermann et al. | |
| 2012/0025111 A1* | 2/2012 | Bryant et al. ............. | 250/515.1 |
| 2012/0034096 A1* | 2/2012 | Appleton ................. | 416/241 A |
| 2012/0093658 A1* | 4/2012 | Appleton et al. ......... | 416/241 R |
| 2012/0107553 A1* | 5/2012 | Appleton et al. ............ | 428/136 |
| 2012/0141291 A1* | 6/2012 | Appleton ................. | 416/241 R |
| 2012/0207612 A1* | 8/2012 | Fixter et al. ............... | 416/229 R |
| 2013/0135135 A1* | 5/2013 | Appleton .......................... | 342/1 |

FOREIGN PATENT DOCUMENTS

| | | | |
|---|---|---|---|
| FR | 2930601 A1 * | 10/2009 | |
| JP | 2001-196782 A | 7/2001 | |
| JP | 2006-114877 A | 4/2006 | |
| KR | 10-2009-0027379 A | 3/2009 | |
| WO | WO 2009140949 A1 * | 11/2009 | |
| WO | WO 2010109174 A1 * | 9/2010 | |
| WO | WO 2010122352 A2 * | 10/2010 | |

OTHER PUBLICATIONS

Chinese Office Action dated Aug. 27, 2014, partial English translation (two (2) pages).

* cited by examiner

*Primary Examiner* — Edward Look
*Assistant Examiner* — Jesse Prager
(74) *Attorney, Agent, or Firm* — Crowell & Moring LLP

(57) ABSTRACT

A rotor blade for a wind turbine includes a casing structure made of flat fiber composite material that forms the rotor blade surface. To reduce interferences to radar systems caused by the use of the rotor blade, at least at the leading edge and the trailing edge of the rotor blade is provided with a fiber composite material is designed for providing a frequency-dependent radar reflection factor for radar radiation that is incident perpendicular to the surface and which has a reflection minimum at a given frequency in the range of 1 GHz to 10 GHz.

19 Claims, 3 Drawing Sheets

ROTOR BLADE FOR A WIND TURBINE, AND A COMBINATION OF A RADAR STATION AND A WIND TURBINE

CROSS REFERENCE TO RELATED APPLICATIONS

The present application claims priority under 35 U.S.C. §119 to German Patent Application No. 10 2010 053 369.6, filed Dec. 3, 2010, the entire disclosure of which is herein expressly incorporated by reference.

BACKGROUND AND SUMMARY OF THE INVENTION

The present invention relates to a rotor blade for a wind turbine, comprising a casing structure, made of flat fiber composite material, which forms the rotor blade surface. The invention further relates to a combination of a radar station and a wind turbine located in the reception range of the radar station.

Wind turbines include a rotatably mounted rotor structure, which is typically formed from a rotatably mounted rotor shaft, a rotor hub at one end of the rotor shaft, and one or more rotor blades (rotor wings) which project from the rotor hub in the radial direction.

In one type of turbine which is widely used, the rotor shaft is mounted in a machine housing ("gondola") so as to be rotatable about a horizontal axis, the machine housing in turn being situated on a vertically projecting tower so as to be rotatable about a vertical axis.

When irradiated by electromagnetic waves from radar systems, such wind turbines generate radar reflections at the tower, at the machine housing, and at the rotor structure, in particular the rotor blades.

Although the radar reflections at the tower and at the machine housing, which are largely constant over time, may be effectively masked in the evaluation of the back-reflected radar radiation using clutter suppression provided in many radar systems, the rotor blades, due to their rotation and the accompanying Doppler shift of the radar radiation which is reflected at the rotor blades, represent a high interference potential for the operation of radar systems having moving target detection.

The extent of the back-reflection of radar radiation at the rotor structure or its rotor blades, as well as the Doppler shift of the radar reflection, depend on the direction of incidence of the radar radiation and the rotational position and rotational speed of the rotor structure. For a radar system having moving target detection, which evaluates such Doppler shifts, this may undesirably result in corresponding portions of the rotor structure such as rotor blades, for example, being misinterpreted as airborne objects. When wind turbines are imaged in this manner as an additional target on the radar screen of the radar system, this may sometimes greatly complicate the detection of the desired targets. Such targets may be, for example, aircraft for an air traffic control radar system, rain clouds for a weather radar system, or ships for a maritime navigation radar system.

During operation of multiple wind turbines that are spatially combined to form a "wind farm," the spurious targets caused by the individual wind turbines appear over a fairly large area which is usually several square kilometers in size, in which unambiguous identification and tracking of the desired targets are then often no longer possible.

Exemplary embodiments of the present invention reduce interferences to radar systems caused by the operation of a wind turbine or a wind farm.

For a rotor blade of the type mentioned above, this is achieved according to the invention in that, at least at the leading edge and the trailing edge of the rotor blade, the fiber composite material is designed for providing a frequency-dependent radar reflection factor for radar radiation that is incident perpendicular to the surface and which has a reflection minimum at a given frequency in the range of 1 GHz to 10 GHz.

The leading edge and the trailing edge of the rotor blade represent the surface sections whose radar reflections with regard to the Doppler effect have the greatest interference potential for the operation of radar systems.

The design of the fiber composite material according to the invention, at least in these regions of the casing structure of the rotor blade, thus ensures a considerable reduction of the interferences, namely, using a radar reflection factor (damping factor) which in the stated frequency range has a reflection minimum for radar radiation which is incident perpendicular to the surface.

The rotor blade according to the invention may have a basic structure similar to rotor blades known from the prior art, namely, for example composed of two half-shells which are each made of a fiber composite solid material (multilayer GRP laminate, for example) and adhesively bonded to one another at the leading edges and trailing edges of the rotor blade.

Thus, according to one embodiment of the invention, the rotor blade is formed from multiple casing shells which are joined together, in particular adhesively bonded to one another.

For example, two half-shells may be provided which are joined together at the leading edges and trailing edges of the rotor blade.

In the invention, however, in the specific material selection and the geometric relationships (for example, material thickness, or layer thicknesses for multilayer material) it is ensured that the stated reflection minimum results.

In the case of a fiber composite solid material, a dimensioning rule which is suitable for this purpose may be expressed by the following formula, for example:

$$d_V = \frac{\lambda_0}{2\sqrt{\varepsilon_V}}$$

where the terms have the following meanings:
$d_V$: thickness of the solid material
$\lambda_0$: free space wavelength of the radar system
$\varepsilon_V$: specific dielectric constant (real part) of the solid material.

For the thickness $d_V$ of the solid material, a reflection minimum results for the frequency $f_0 = c/\lambda_0$ of the radar system (where c=speed of light) and for integer multiples thereof, wherein the integers are odd.

In the case of a sandwich design comprising at least one core material layer and at least two cover layers, similar dimensioning rules may be taken into account for achieving the desired reflection minimum. For example, for the case of a symmetrical sandwich structure, which is understood to mean a design having front and back layers of equal thickness and including the same materials, with a core material situated in between, a suitable dimensioning may be established, for example, as follows:

As soon as the materials of the cover layers and of the core material as well as the thicknesses of the fiber-reinforced cover materials have been defined, based on mechanical principles, the thickness of the core material results approximately from the following formula:

$$d_K = \frac{\lambda_0}{\sqrt{\varepsilon_K}} \left( \frac{1}{4} - \frac{d_D \sqrt{\varepsilon_D}}{\lambda_0} \right)$$

where the terms have the following meanings:
$d_K$: thickness of the core material
$\lambda_0$: free space wavelength of the radar system
$\varepsilon_K$: specific dielectric constant (real part) of the core material
$d_D$: thickness of the cover layer material
$\varepsilon_D$: specific dielectric constant (real part) of the cover layer material.

The following limitations are particularly preferably taken into consideration:

$$\varepsilon_K \leq 1.8;$$ a)

i.e., the specific dielectric constant of the core material should be less than the value 1.8. This applies for most foams, honeycombs, etc.

$$d_D \sqrt{\varepsilon_D} < \frac{\lambda_0}{4};$$ b)

i.e., the electrical thickness of the cover layer material should be less than one-fourth the wavelength of the radiation emitted by the radar system.

Thus, using the above formula, the specified thickness and the specific dielectric constant of the cover layer material as well as the specified specific dielectric constant of the core material approximately result in the thickness of the core material for which the reflection factor is a minimum for the frequency $f_0=c/\lambda_0$ of the radar system (where c=speed of light).

Based on this starting value, "fine tuning" of the core layer thickness may also be carried out with the aid of computer simulation, so that the reflection minimum is matched exactly to the frequency of the radar system.

Similarly, as is known from the prior art, for the rotor blade according to the invention the stability thereof may also be improved by means of at least one web situated in the interior of the casing structure which stabilizes the casing structure. One or more such webs may be made of flat fiber composite material, for example, which preferably is likewise designed for providing a frequency-dependent radar reflection factor for radar radiation that is incident perpendicular to the surface and which has a reflection minimum at a given frequency in the range of 1 GHz to 10 GHz.

The frequency of the radar radiation may be identical or at least essentially identical (for example, with less than a 10% deviation) to the frequency for which the fiber composite material has the stated reflection minimum at the leading and trailing edges of the rotor blade (and optionally, at the web or webs).

In one embodiment of the invention, the fiber composite material used for providing the reflection minimum is designed as a fiber composite solid material. Alternatively, this fiber composite material may have a sandwich design comprising multiple (identical or different) fiber composite material layers. In particular, a symmetrical sandwich structure, for example, may be used.

A fiber composite solid material may be designed, for example, as a laminate, which includes multiple identical fiber material layers (woven fabric, braiding, laid webs, etc.). A simple sandwich design provides a core layer made of plastic foam, for example, in particular rigid foam, or wood, in particular lightweight wood, or a honeycomb or corrugated structure (for example, made of a resin-impregnated paper or a GRP material (containing a glass fiber fabric, for example)), and cover layers, made of the same or different fiber composite material layers (for example, GRP etc.), on both sides thereof.

The fiber composite material used for providing the stated reflection minimum at the leading and trailing edges of the rotor blade preferably has a low electrical conductivity, either as a whole (over the entire thickness of the casing structure) or at least in a region close to the surface, which thus forms the surface at the leading and trailing edges. Such a design reduces reflection of incident radar energy. In the ideal case, the predominant portion of the radar energy is led through the casing structure of the rotor blade. The rotor blade is thus, so to speak, more or less transparent to most of the incident radar energy, so that overall only relatively small quantities of energy are reflected back to the radar system by the rotor blade, thus further reducing the interferences in the radar operation.

In this regard, for providing the casing structure at least at the leading and trailing edges of the rotor blade and/or for forming the optionally provided stabilizing web or webs, fiber composite materials having poor electrical conductivity (for example, materials having an electrical loss factor "tan δ" of less than 0.01) or which are considered to be electrical nonconductors (for example, materials having an electrical loss factor "tan δ" of less than 0.001) are preferred.

For providing electrically nonconductive fiber composite materials, a fiber material composed of electrically nonconductive fibers such as glass fibers, aramid fibers, polyethylene fibers, etc., may be used in conjunction with an electrically nonconductive matrix, for example epoxy resin, polyester resin, etc.

For a sandwich design, i.e., a design having three or more material layers, individual layers may also be formed, for example, from the mentioned rigid foams, etc.

For achieving the stated reflection minimum, on the one hand it is advantageous when the "first layer" of the flat fiber composite material, which is thus directly impacted by the incident radar radiation, is made of a fiber composite material which is poorly electrically conductive or nonconductive. In this regard, CFRP is rather unfavorable in this case due to its relatively high electrical conductivity, and instead GRP, for example, is preferred. On the other hand, the "geometry" of the flat fiber composite material used for providing the leading and trailing edges of the rotor blade (of the web or webs) is very important within the scope of the invention.

When this fiber composite material is designed as a fiber composite solid material, as well as when this fiber composite material has a sandwich design comprising multiple fiber composite material layers, multiple interfaces always result, viewed in the direction of the radar radiation, between directly adjacent material layers or between such a material layer and air (on the outer side or the inner side of the casing structure of the rotor blade). By suitably selecting the mutual distances between these interfaces, viewed in the direction of the radar radiation, in conjunction with the dielectric constants of the materials (or air) located on both respective sides of these interfaces, the reflection minimum provided according to the invention may be easily achieved in that the radar radiation components that are back-reflected by the various interfaces radar interfere in an essentially destructive manner.

Material combinations or material arrangements suitable for this purpose may be specified, for example, taking the above-described "dimensioning rules" into account. The values indicated in the above formulas for the thickness of a solid material ($d_V$) or the thickness of the core material ($d_K$) for a symmetrical sandwich structure are preferably at least approximately provided, for example with a deviation of the actual thickness from the thickness specified with reference to the applicable formula of less than 10%, in particular less than 5%, of the wavelength of the radar radiation which results in the material in question (fiber composite solid material or core material).

Carrying out appropriate computer simulations is also suitable.

In general, poorly electrically conductive fiber composite materials such as GRP are preferred, in particular for forming the first material layer (for the case of a design composed of multiple different layers).

In one embodiment it is provided that the fiber composite material which is used for providing the reflection minimum (at the "first" surface directly impacted by the radar radiation) has a specific electrical surface resistance of greater than $10^3$ ohm/square.

In one embodiment it is provided that the reflection minimum has a value of less than −20 dB, in particular less than −25 dB.

In particular, when use is made of the effect of destructive interference by radar radiation components that are successively back-reflected in the direction of radar radiation by the interfaces that are impacted by the incident radar radiation, relatively narrow-band reflection minima may advantageously be provided, for example having a half-width value of less than 0.5 GHz, in particular less than 0.25 GHz.

It is understood that the position of the reflection minimum which is provided according to the invention is to be adapted as closely as possible to the frequency of the radar radiation which is expected during use of the rotor blade. If the frequency of the reflection minimum deviates appreciably from this radar frequency, the radar frequency is still preferably within the half-width value of the reflection minimum.

In one embodiment the frequency-dependent reflection factor in the frequency range of 1 GHz to 10 GHz has exactly one minimum. Alternatively, however, more than one minimum of the reflection factor may be provided in this frequency range, in particular exactly two minima, for example. In the latter case, the position of the two minima may be adapted, for example, to two different radar frequencies of two different radar systems (for example, an air traffic control radar system and a weather radar system).

According to another aspect of the invention, a combination of (at least) one radar station and one wind turbine located in the reception range of the radar station is provided, wherein the frequency of the reflection minimum corresponds to the radar frequency of the radar station.

A possible deviation of the frequency of the reflection minimum from the radar frequency is preferably less than 0.5 GHz. The reflection factor for the radar frequency is preferably less than −15 dB, particularly preferably less than −20 dB.

In one refinement, the combination comprises two radar stations having radar frequencies which are different from one another, for example an air traffic control radar system and a maritime navigation radar system, wherein the frequency-dependent radar reflection factor provided using the fiber composite material has two reflection minima of the described type, the frequencies of which correspond to the radar frequencies of the radar stations, optionally once again with deviations which are small at most, as previously described for the case of one radar station and one reflection minimum.

Each radar station may be a radar station having moving target detection by evaluation of a Doppler shift of the back-reflected radar signal.

If the combination comprises multiple radar stations having different radar frequencies, according to one embodiment it is provided that, among the radar frequencies, at least one frequency pair exists in which one radar frequency is an integer multiple of the other radar frequency. One example of such is an air traffic control radar system having a radar frequency of 3 GHz in combination with a maritime navigation radar system having a radar frequency of 9 GHz.

Other objects, advantages and novel features of the present invention will become apparent from the following detailed description of one or more preferred embodiments when considered in conjunction with the accompanying drawings.

BRIEF DESCRIPTION OF THE DRAWINGS

The invention is described in greater detail below based on exemplary embodiments with reference to the accompanying drawings, which show the following.

DETAILED DESCRIPTION OF THE DRAWINGS

Figure 1:
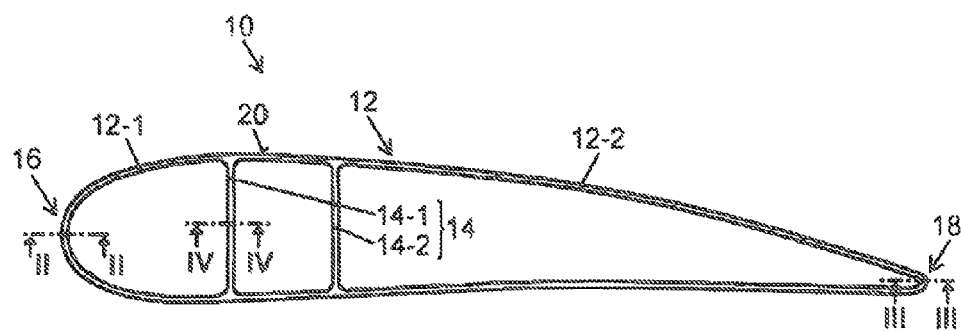
FIG. 1 shows a sectional view of a rotor blade for a wind turbine.

FIG. 1 illustrates in a sectional view the structure of a rotor blade 10 for a wind turbine, comprising a casing structure 12, and an inner structure 14 which stabilizes the casing structure 12 and which in the illustrated exemplary embodiment is formed from two webs 14-1 and 14-2 which extend transversely with respect to the direction of extension of the rotor blade profile.

The rotor blade 10 has a leading edge 16 and a trailing edge 18.

The outer side of the casing structure 12 defines the surface 20 of the rotor blade 10, and the casing structure 12 is made of flat fiber composite material, in the illustrated exemplary embodiment two different regions, i.e., different fiber composite materials 12-1 and 12-2, being used. Material 12-1 is used for forming the leading edge 16 and the casing structure regions adjacent thereto, approximately up to the middle of the illustrated rotor blade 10 (on the other side of webs 14-1, 14-2). Material 12-2 is provided for forming the regions of the rotor blade 10 situated behind same, up to and including the trailing edge 18.

The webs 14-1, 14-2 are also each made of (identical) fiber composite material which, however, is different from the flat fiber composite materials 12-1 and 12-2.

One special feature of the rotor blade 10 is that, at least at the leading edge 16 and the trailing edge 18, (and in the illustrated example also in the region of the webs 14-1, 14-2), the particular fiber composite material 12-1 and 12-2 (and in the illustrated example, also the fiber composite materials 14-1, 14-2) is designed for providing a frequency-dependent radar reflection factor R for electromagnetic radar radiation that is incident perpendicular to the surface and which has a reflection minimum at a given frequency in the range of 1 GHz to 10 GHz.

Figure 2:
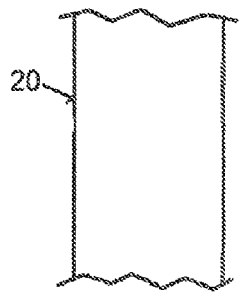
FIG. 2 shows a sectional view along line II-II in FIG. 1.
Figure 3:
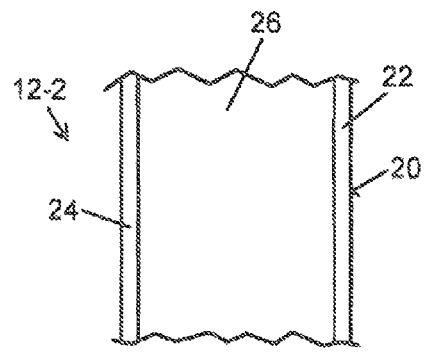
FIG. 3 shows a sectional view along line III-III in FIG. 1.
Figure 4:
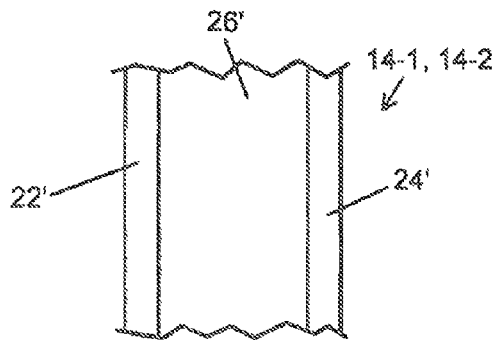
FIG. 4 shows a sectional view along line IV-IV in FIG. 1.

FIGS. 2, 3, and 4 show the respective designs of the flat fiber composite materials 12-1, 12-2 and 14-1, 14-2.

The fiber composite material 12-1 (FIG. 2) has a monolithic GRP design, i.e., is composed of a layer of GRP material having a thickness of 12.9 mm. The dielectric constant of the GRP material 12-1 is approximately 4.3.

The fiber composite material 12-2 (FIG. 3) is a sandwich construction made of an outer GRP cover layer 22 (thickness 1 mm, dielectric constant 4.3), an inner GRP cover layer 24 (thickness 1 mm, dielectric constant 4.3), and a rigid foam core 26 (thickness 11.3 mm, dielectric constant 1.1).

The fiber composite material 14-1, 14-2 (FIG. 4) is likewise a sandwich construction made of an outer GRP cover layer 22' (thickness 2 mm, dielectric constant 4.3), an inner GRP cover layer 24' (thickness 2 mm, dielectric constant 4.3), and a rigid foam core 26' (thickness 8.5 mm, dielectric constant 1.1).

Figure 5:
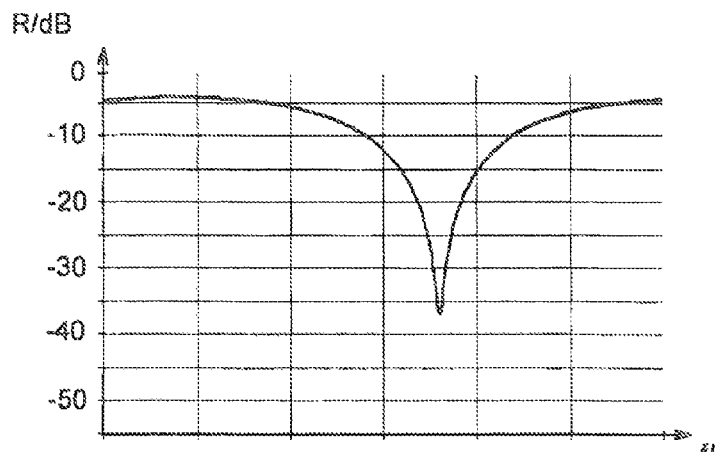
FIG. 5 shows the frequency-dependent curve of the radar reflection factor for the material illustrated in FIG. 2.
Figure 6:
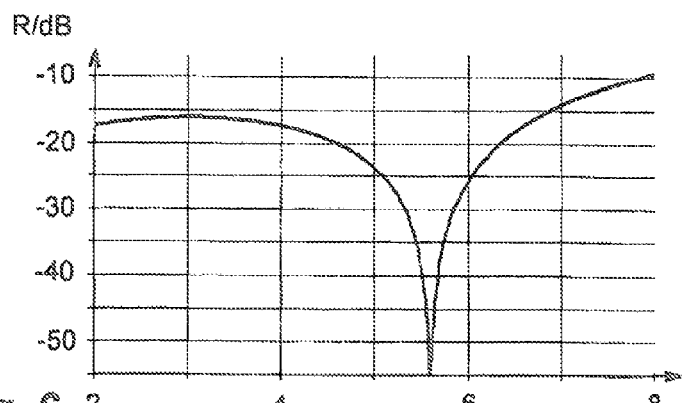
FIG. 6 shows the frequency-dependent curve of the radar reflection factor for the material illustrated in FIG. 3.
Figure 7:
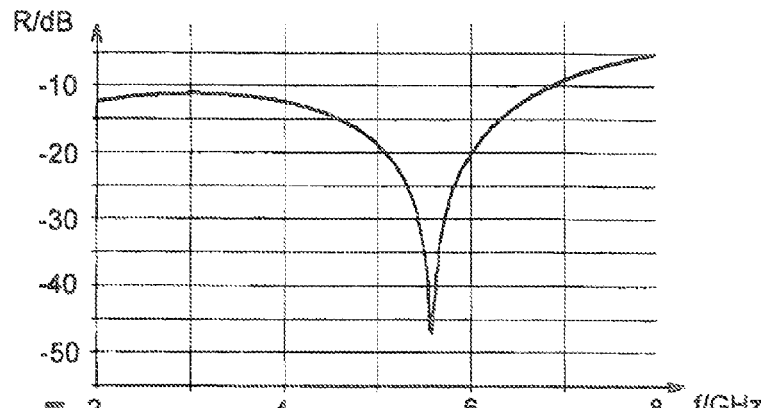
FIG. 7 shows the frequency-dependent curve of the radar reflection factor for the material illustrated in FIG. 4.

FIGS. 5, 6, and 7 illustrate the computed frequency-dependent reflection factor curves of the fiber composite materials illustrated in FIGS. 2, 3, and 4 for perpendicular incidence of radiation.

FIG. 5 shows the reflection factor R for the fiber composite material 12-1.

FIG. 6 shows the reflection factor R for the fiber composite material 12-2.

FIG. 7 shows the reflection factor R for the fiber composite material 14-1, 14-2.

As illustrated, the reflection factors of the three designs are −34 dB, −55 dB, and −47 dB, respectively, at a frequency of 5.6 GHz, which is typical for a weather radar system, for example. Thus, approximately only 0.02%, 0.0003%, and 0.002% of the incident radar energy is reflected at the respective designs.

Conversely, this means that approximately 99.98%, 99.9997%, and 99.998% of the incident radar energy is transmitted through the respective designs. Thus, in the relevant frequency range the rotor blade 10 is largely transparent to the incident radar energy, so that overall the radar reflections at the rotor blade 10 are significantly reduced.

In the illustrated exemplary embodiment, the half-width values of the reflection minima at 5.6 GHz are less than 0.5 GHz in each case.

In the following description of another exemplary embodiment, the same reference numerals are used for functionally equivalent components, in each case with a small letter "a" suffix added for distinguishing the embodiment. Essentially, only the differences from the previously described exemplary embodiment are discussed, and in other respects explicit reference is hereby made to the description of the preceding exemplary embodiment.

Figure 8:
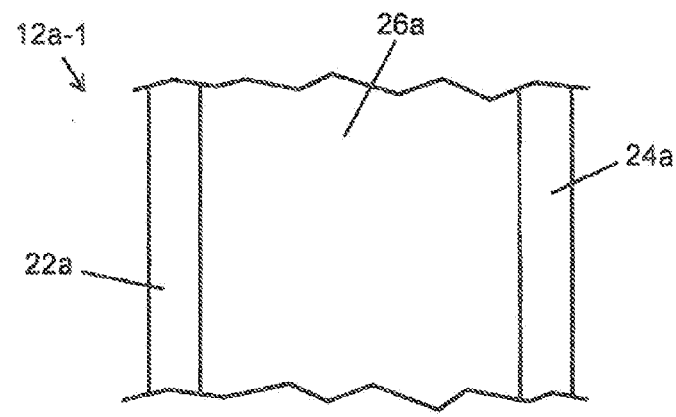
FIG. 8 shows a sectional view of a material according to another exemplary embodiment.

FIG. 8 illustrates a further example of a design which is suitable for reducing radar reflections, and shows a sectional view of a flat fiber composite material 12*a*-1.

The fiber composite material 12*a*-1 may be used, for example for a rotor blade of the type illustrated in FIG. 1, as a substitute for one or more of the fiber composite materials 12-1, 12-2 and 14-1, 14-2 used therein. In one embodiment, the fiber composite material 12*a*-1 illustrated in FIG. 8 is used for the entire casing structure (and the optionally provided inner structure) of a rotor blade of the type illustrated in FIG. 1.

The fiber composite material 12*a*-1 is a sandwich construction composed of an outer GRP cover layer 22*a* (thickness 3 mm, dielectric constant 4.3), an inner GRP cover layer 24*a* (thickness 3 mm, dielectric constant 4.3), and a honeycomb core 26*a* made of resin-impregnated paper (thickness 17.5 mm, dielectric constant 1.07).

A special feature of the fiber composite material 12*a*-1 is that its frequency-dependent radar reflection factor R has two reflection minima at given frequencies in the range of 1 GHz to 10 GHz for radar radiation which is incident perpendicular to the surface.

Figure 9:
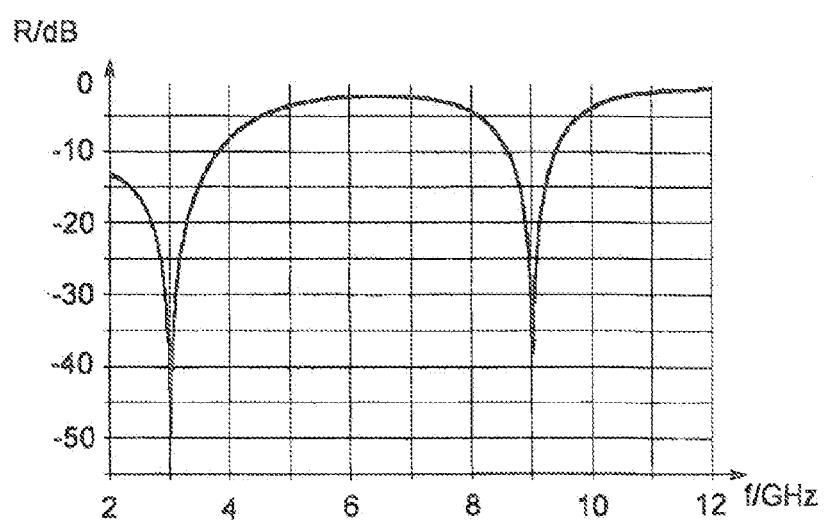
FIG. 9 shows the associated frequency-dependent curve of the radar reflection factor.

As is apparent from FIG. 9, these reflection minima are present at the frequencies of 3 GHz (for example, the frequency of a military air traffic control radar system) and 9 GHz (for example, the frequency of a maritime navigation radar system). At these frequencies the radar reflections are reduced significantly, namely, to 0.001% (at 3 GHz) and to 0.02% (at 9 GHz).

By use of the invention, i.e., the described exemplary embodiments, a rotor blade for a wind turbine may be implemented for which the radar reflections are significantly reduced. In particular, when the rotor blade is used for a plurality of wind turbines that are spatially combined to form a wind farm located in the detection range of one or more radar systems, it is thus possible to ensure radar operation with significantly less interference. According to the invention, the reflection-minimized fiber composite material is used as described, at least at the leading edge and at the trailing edge of the rotor blade. However, even further structural sections of the rotor blade, in particular the entire casing structure and an optionally provided stabilizing inner structure, may be provided in one of the described designs. Depending on the radar frequency or frequencies expected during use of the rotor blade, the particular arrangement and the combination of the materials and their dimensioning, layer thickness(es), and electromagnetic material constants may be modified.

In a departure from the described exemplary embodiments, regions of the rotor blade subjected to particularly high mechanical stress are made of, for example, a fiber composite material containing CFRP instead of the described GRP, or are made of metal (in particular steel, for example).

In addition, for reasons of lightning protection it may be necessary to provide metallic conductors in order to divert lightning currents from the rotor blade tip or the rotor blade surface, for example, to ground (for example, via a machine housing and a tower).

Although the use of epoxy resin as a matrix is frequently preferred for the described fiber composite materials, other matrix materials such as thermoplastic materials, for example, are also suitable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotor blade for a wind turbine, comprising:
   a casing structure of first and second flat fiber composite materials, which forms a rotor blade surface, wherein at least at a leading edge and trailing edge of the rotor blade, the first and second fiber composite materials provide a frequency-dependent radar reflection factor for radar radiation that is incident perpendicular to the rotor blade surface and that have a reflection minimum at a given frequency in a range of 1 GHz to 10 GHz; and
   an inner structure configured to stabilize the casing structure, wherein the inner structure comprises a third fiber composite material having a reflection minimum at a given frequency in the range of 1 GHz to 10 GHz,
   wherein the first fiber composite material covers at least the leading edge and the second fiber composite material covers at least the trailing edge,
   wherein the inner structure is arranged within the casing structure so that it is located below a portion of the rotor blade surface covered by the first fiber composite material and outside of a portion of the rotor blade surface covered by the second fiber composite material, and
   wherein the first and second fiber composite materials are different fiber composite materials.

2. The rotor blade according to claim 1, wherein the first fiber composite material used for providing the reflection minimum is a fiber composite solid material.

3. The rotor blade according to claim 2, wherein a thickness of the first fiber composite solid material has, at least approximately, a value of $$d_V = \frac{\lambda_0}{2\sqrt{\varepsilon_V}}$$

where:
$d_V$ is the thickness of the solid material,
$\lambda_0$ is a free space wavelength of a radar system, and
$\varepsilon_V$ is a real part of a specific dielectric constant of the solid material.

4. The rotor blade according to claim 1, wherein the second fiber composite material used for providing the reflection minimum has a sandwich design comprising multiple fiber composite material layers and at least one core material layer.

5. The rotor blade according to claim 4, wherein the sandwich design is symmetrical, with two fiber composite material layers as cover layers, and wherein a thickness of the core material layer has, at least approximately, a value of $$d_K = \frac{\lambda_0}{\sqrt{\varepsilon_K}} \left( \frac{1}{4} - \frac{d_D \sqrt{\varepsilon_D}}{\lambda_0} \right)$$

where:
$d_K$ is the thickness of the core material,
$\lambda_0$ is a free space wavelength of a radar system,
$\varepsilon_K$ is a real part of a specific dielectric constant of the core material,
$d_D$ is a thickness of the cover layers, and
$\varepsilon_D$ is a real part of a specific dielectric constant of the cover layer material.

6. The rotor blade according to claim 1, wherein the first and second fiber composite materials used for providing the reflection minimum have a specific electrical surface resistance of greater than $10^3$ ohm/square.

7. The rotor blade according to claim 1, wherein the reflection minimum has a value of less than −20 dB.

8. The rotor blade according to claim 7, wherein the reflection minimum has a value of less than −25 dB.

9. The rotor blade according to claim 1, wherein the frequency-dependent reflection factor in the frequency range of 1 GHz to 10 GHz has exactly one minimum.

10. The rotor blade according to claim 1, wherein the frequency-dependent reflection factor in the frequency range of 1 GHz to 10 GHz has exactly two minima.

11. An apparatus comprising:
    a radar station; and
    a wind turbine located in the reception range of the radar station, wherein rotor blades of the wind turbine comprise
       a casing structure of first and second flat fiber composite materials, which forms a rotor blade surface, wherein at least at a leading edge and trailing edge of the rotor blade, the first and second fiber composite materials provide a frequency-dependent radar reflection factor for radar radiation that is incident perpendicular to the rotor blade surface and that have a reflection minimum at a given frequency in a range of 1 GHz to 10 GHz, and a frequency of the reflection minimum corresponds to a radar frequency of the radar station; and
       an inner structure configured to stabilize the casing structure, wherein the inner structure comprises a third fiber composite material having a reflection minimum at a given frequency in the range of 1 GHz to 10 GHz,
       wherein the first fiber composite material covers at least the leading edge and the second fiber composite material covers at least the trailing edge, and
       wherein the inner structure is arranged within the casing structure so that it is located below a portion of the rotor blade surface covered by the first fiber composite material and outside of a portion of the rotor blade surface covered by the second fiber composite material, and
       wherein the first and second fiber composite materials are different fiber composite materials.

12. The rotor blade according to claim 1, wherein the first and second fiber composite materials together cover an entire surface of the rotor blade.

13. The rotor blade according to claim 1, wherein the third fiber composite material is a different fiber composite material from the first and second fiber composite materials.

14. The rotor blade according to claim 2, wherein the fiber composite solid material is a monolithic GRP material.

15. The rotor blade according to claim 4, wherein the multiple fiber composite material layers comprise a GRP material and the at least one core material layer is a rigid foam core.

16. The apparatus according to claim 11, wherein the first and second fiber composite materials together cover an entire surface of the rotor blade.

17. The apparatus according to claim 11, wherein the third fiber composite material is a different fiber composite material from the first and second fiber composite materials.

18. The apparatus according to claim 11, wherein the first fiber composite material is composed of a monolithic material and the second fiber composite material is composed of at least one core material layer surrounded by a first fiber composite material layer and a second fiber composite material layer.

19. The apparatus according to claim 18, wherein the monolithic material and the first and second fiber composite material layers are a GRP material.

\* \* \* \* \*